Patented Dec. 17, 1940

2,224,904

UNITED STATES PATENT OFFICE 2,224,904

COLORING OF PETROLEUM DISTILLATES

Harold W. Elley and Herbert W. Daudt, Wilmington, Del., assignors to E. I. du Pont de Nemours & Company, Wilmington, Del., a corporation of Delaware No Drawing. Application September 3, 1937, Serial No. 162,395

5 Claims. (Cl. 44—9)

This invention relates to the production of colored gasolines and petroleum distillates, such as motor fuels, which are reddish to bluish-red in shade, have a bronzy fluorescence and are stable to the action of sunlight and upon storage, and to monazo compounds for producing such colored compositions.

The problem of coloring gasoline and similar low boiling point petroleum distillates presents numerous special problems among which are the necessity of a coloring material which has a high tinctorial value, will give solutions of the desired color and fluorescence and will give stable colored compositions upon exposure to light and upon storage. It is necessary that the desired properties shall be present in distillates containing high and low proportions of unsaturated aliphatic hydrocarbons and in the presence of tetraethyl lead, both of which deleteriously affect some coloring compounds. Distillates containing tetraethyl lead are commonly referred to as being ethylated. A few materials which can be used to give orange and blue colors are known, but insofar as we are aware these colors do not have all of the necessary properties of high tinctorial value, reddish to bluish-red shades, bronzy fluorescence and high stability which are now desired.

It is an object of the invention to provide colored compositions of petroleum distillates, such as gasoline and similar petroleum distillates having reddish to bluish-red shades and a bronzy fluorescence, both those which contain tetraethyl lead and those which do not contain this ingredient. Another object is to provide compounds for such colored compositions which have high tinctorial value and compositions which have high stability to light and upon storage. Other objects of the invention will be apparent from the following description.

Azo compounds have now been discovered which have the desired high tinctorial value, stability in the distillates and the property of producing the desired reddish to bluish-red shades and bronzy fluorescence both in ethylated and in non-ethylated mixtures which contain both high and low proportions of unsaturated aliphatic hydrocarbons. The invention will be more fully understood from the following description and by reference to the examples which illustrate but do not limit the invention thereto.

Example 1

153 parts of 2:5-di-methoxy aniline were dissolved in a solution of hydrochloric acid containing 250 parts of 36.% HCl in 2000 parts of water. The solution was cooled to 0–5° C. with ice, and diazotized at this temperature by the addition of 69 parts of sodium nitrite. The diazo solution was maintained within the above temperature range until used for coupling.

An alkaline solution of beta naphthol was prepared by dissolving 151 parts of beta naphthol in a solution containing 110 parts of sodium hydroxide in 2000 parts of water. This solution was cooled to 0–5° C.

The diazo solution was added to the rapidly stirred alkaline solution of beta naphthol. A dark red precipitate separated immediately. The reaction mass was stirred for 30 minutes. An appreciable excess of the coupling component was maintained in the reaction mixture.

The mass was then heated to 70° C. and the precipitate was separated by filtration. After thorough washing, the residue was preliminarily dried at room temperature, and then at 70° C.

The dried material was insoluble in water but soluble in most organic solvents, including alcohol, ether benzene, chloroform, petroleum ether and gasolines. The solutions were red to bluish-red in color.

A portion of the product was purified by crystallization from alcohol. The purified product melted in the range 155°–156° C.

The compound is represented by the formula

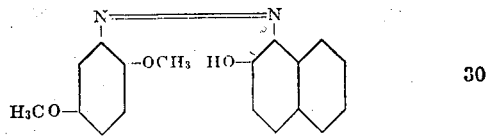

Example 2

By a process similar to Example 1 in which an equivalent weight of cresidine was used instead of 2:5-dimethoxy aniline, a compound was made having properties closely approximating the properties of the compound of Example 1 and giving similar colored gasolines of somewhat more orange red shades. The compound is represented by the formula

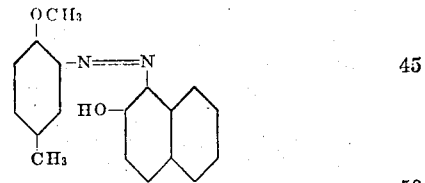

Example 3

A colored gasoline was prepared by dissolving about one part of the compound described in Example 1 in a million parts of gasoline which contained a low proportion of unsaturated aliphatic hydrocarbons.

The gasoline was colored a bluish-red shade having a bronzy fluorescence. The extremely small proportion of the compound in the composition had no perceptible effect on the fuel properties of the gasoline. The colored material was given light and storage tests and was found to have excellent stability.

The same results were obtained with this coloring composition in gasoline which contained a high proportion of unsaturated aliphatic hydrocarbons.

The same results were also obtained using the same proportions of compound of Example II in gasolines containing both high and low proportions of unsaturated aliphatic hydrocarbons. The color of the gasolines was substantially the same as that obtained with the compound of Example 1 except that the color was more orange-red in shade.

*Example 4*

Colored gasolines were prepared from gasolines containing both high and low proportions of unsaturated aliphatic hydrocarbons and tetra-ethyl lead. The gasolines contained in one million parts about 1000 parts of tetraethyl lead and about 1000 parts of a mixture of equal parts of ethylene dibromide and ethylene dichloride, the latter mixture being that commonly used with lead ethyl in gasoline mixtures as a modifying agent. One part of the dye described in Example 1 was dissolved in 500 parts of benzene and added to the gasolines. The color of the gasolines was a bluish-red shade having a bronzy fluorescence. The tinctorial value of the dye and stability of the color upon storage and exposure to light were about the same as that described in the preceding examples.

Similar results were obtained by using the dye of Example 2 in the last mentioned gasoline mixtures except that the color was more orange-red in shade.

Instead of adding the dye directly to the gasoline or as a benzene solution thereof, it can be dissolved in suitable proportions in a mixture of tetra-ethyl lead, ethylene dibromide and ethylene dichloride and added to the gasoline therewith.

Mixtures of the compounds of Examples 1 and 2 can be used to obtain compositions which are intermediate in color between the products of Examples 3 and 4.

The compounds of the invention were compared with closely related compounds as to tinctorial value, color, fluorescence and stability in gasoline. Compounds made by coupling beta-naphthol to diazotized aniline, ortho- and para-toluidine, ortho- and para-anisidine, meta- and para-xylidine, 4-nitro-2-amino-anisole and 4-chloro-2-amino-anisole were compared with the compounds of the invention. The compounds of the invention had higher tinctorial values than the compounds which were made by coupling beta-naphthol to diazotized aniline or to ortho-anisidine and which gave orange shades without fluorescence and orange shades with fluorescence, respectively. All the other closely related compounds were undesirable because of one or more of the following characteristics: relatively low stability when exposed to light and upon storage, especially in the presence of tetraethyl lead, yellow or orange shades, lack of bronzy fluorescence and lack of reddish or bluish-red coloration.

The particular type of amino-benzenes which give compounds having the desired properties when they are diazotized and coupled to beta-naphthol are those in which the amino and an alkoxy group are in adjacent positions of the benzene ring and in which an alkyl or another alkoxy group is in position para to the alkoxy group. In a given diazo component the alkyl and alkoxy groups may have the same or a different number of carbon atoms. The alkyl and alkoxy groups containing 1 to 3 carbon atoms, such as methyl, ethyl and propyl are desirable as the compounds of such groups are readily available and convenient to prepare, and the compounds substituted by methyl and methoxy are preferred.

One part of the compound per million parts of petroleum distillate is ordinarily fully sufficient to give a distinctive coloration but more or less can be used, the degree of coloration depending upon the amount used. As much as two to twelve parts, and even more per million of gasoline can be used but as a general rule the high tinctorial nature of the compounds makes such high proportions of the described compounds undesirable. Wide variations in the proportions of tetra-ethyl lead and unsaturated aliphatic hydrocarbons can also be made without detrimentally affecting the properties of the colored distillates.

The term, "petroleum distillate" as used in the specification and claims refers to the petroleum distillates such as motor fuels. Gasoline and kerosene are representative distillates but it is to be understood that higher and lower boiling point distillates are contemplated.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

We claim:

1. A colored composition comprising a petroleum distillate and as coloring material a compound represented by the formula

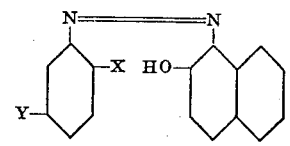

in which X is alkoxy containing 1 to 3 carbon atoms and Y is one of the group consisting of alkyl and alkoxy having 1 to 3 carbon atoms, said coloration being characterized by a reddish to bluish-red shade with a bronzy fluorescence and relatively high stability upon exposure to light and upon storage.

2. A colored composition comprising a petroleum distillate containing tetra-ethyl lead and as coloring material a compound represented by the formula

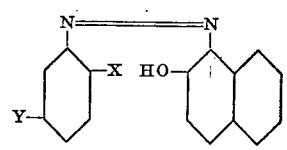

in which X is alkoxy containing 1 to 3 carbon atoms and Y is one of the group consisting of alkyl and alkoxy having 1 to 3 carbon atoms, said coloration being characterized by a reddish to bluish-red shade with a bronzy fluorescence and relatively high stability upon exposure to light and upon storage.

3. A colored composition comprising a petroleum distillate containing as coloring material the compound represented by the formula

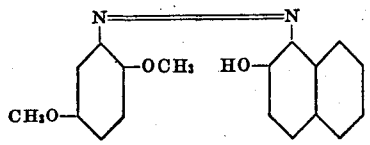

said coloration being characterized by a bluish-red shade with a bronzy fluorescence and relatively high stability upon exposure to light and upon storage.

4. A colored composition comprising a petroleum distillate containing tetra-ethyl lead and as coloring material the compound represented by the formula

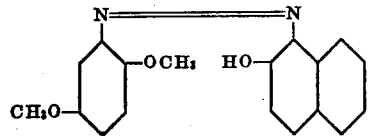

said coloration being characterized by a bluish-red shade with a bronzy fluorescence and relatively high stability upon exposure to light and upon storage.

5. A colored composition containing a petroleum distillate containing tetra-ethyl lead and as coloring material the compound represented by the formula

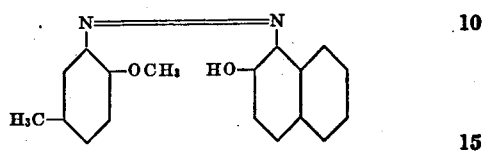

said coloration being characterized by a reddish to bluish-red shade with a bronzy fluorescence and relatively high stability upon exposure to light and upon storage.

HAROLD W. ELLEY.
HERBERT W. DAUDT.